US008267334B2

(12) United States Patent
Lee

(10) Patent No.: US 8,267,334 B2
(45) Date of Patent: Sep. 18, 2012

(54) SOLENOID VALVE FOR BRAKE SYSTEM

(75) Inventor: Chung Jae Lee, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 954 days.

(21) Appl. No.: 12/124,417

(22) Filed: May 21, 2008

(65) Prior Publication Data
US 2009/0095929 A1 Apr. 16, 2009

(30) Foreign Application Priority Data

Oct. 11, 2007 (KR) .................. 10-2007-0102349
Oct. 11, 2007 (KR) .................. 10-2007-0102357

(51) Int. Cl.
*F16K 31/06* (2006.01)
(52) U.S. Cl. .............. 239/585.4; 251/129.15; 303/119.2
(58) Field of Classification Search ............. 251/129.15; 303/119.2; 239/585.1–585.5
See application file for complete search history.

(56) References Cited

U.S. PATENT DOCUMENTS

| 5,267,785 | A | * | 12/1993 | Maisch | 303/119.2 |
| 5,335,984 | A | * | 8/1994 | Alaze et al. | 303/119.2 |
| 5,388,899 | A | * | 2/1995 | Volz et al. | 303/119.2 |
| 5,425,575 | A | * | 6/1995 | Schmidt et al. | 303/119.2 |
| 5,542,755 | A | * | 8/1996 | Staib et al. | 303/119.2 |
| 5,605,386 | A | * | 2/1997 | Ziegler et al. | 303/119.2 |
| 5,683,151 | A | * | 11/1997 | Friedow et al. | 303/119.2 |
| 5,803,556 | A | * | 9/1998 | Weis et al. | 303/119.2 |
| 6,152,420 | A | * | 11/2000 | Hohl | 251/129.02 |
| 6,347,844 | B1 | * | 2/2002 | Hosoya et al. | 303/119.2 |
| 6,364,430 | B1 | | 4/2002 | Park | |
| 6,382,250 | B1 | | 5/2002 | Gruschwitz et al. | |
| 6,644,623 | B1 | * | 11/2003 | Voss et al. | 251/129.15 |
| 6,663,194 | B2 | * | 12/2003 | Cheong | 303/117.1 |
| 6,789,779 | B2 | | 9/2004 | Wilde et al. | |
| 2003/0201418 | A1 | * | 10/2003 | Ahn | 251/129.15 |
| 2005/0051749 | A1 | * | 3/2005 | Lee | 251/129.15 |

FOREIGN PATENT DOCUMENTS

| DE | 19954617 A1 | 5/2000 |
| EP | 1 647 460 A1 | 4/2006 |
| JP | 11166659 * | 6/1999 |
| KR | 10-2002-0021134 | 3/2002 |

OTHER PUBLICATIONS

Chinese Office Action issued in Chinese Patent Application No. 200810110389.X, mailed Mar. 9, 2011.
Chinese Office Action issued in Chinese Patent Application No. 200810110389.X, dated Sep. 7, 2011.

* cited by examiner

Primary Examiner — John Bastianelli
(74) Attorney, Agent, or Firm — McDermott Will & Emery LLP

(57) ABSTRACT

A solenoid valve for a brake system enabling miniaturization of the valve and having an improved configuration to facilitate assembly and production of the valve. The solenoid valve includes an armature provided at one end thereof with an opening/closing member, a valve housing including a hollow first valve block fixed in a modulator block and a second valve block disposed below the first valve block and having an inlet for introduction of fluid, a valve seat installed in the first valve block and having a flow-hole to be opened or closed by the opening/closing member and a hollow extending longitudinally from the flow-hole, and an orifice sleeve located in the second valve block to define a fluid discharge passage and having an orifice formed in one end thereof to communicate with the hollow of the valve seat.

9 Claims, 3 Drawing Sheets

SOLENOID VALVE FOR BRAKE SYSTEM

BACKGROUND OF THE INVENTION

1. Field of the Invention

The present invention relates to a solenoid valve for a brake system, and more particularly, to a solenoid valve for a brake system having an improved assembly configuration of constituent elements thereof.

2. Description of the Related Art

Generally, a vehicular hydraulic brake slows or stops a vehicle by applying hydraulic pressure to a master cylinder according to operation of a brake pedal. In this case, when a greater braking force than a stoppage frictional force between a tire and a road surface is applied to the tire, there occurs a tire slippage phenomenon on the road surface.

However, since a coefficient of kinetic friction is less than a coefficient of static friction, it is necessary to prevent the tire slippage phenomenon in order to achieve optimal braking. In addition, it is necessary to prevent a steering lock phenomenon that prevents steering during operation of the brake.

An anti-lock brake system serves to prevent the above-described phenomenon by controlling hydraulic pressure applied to a master cylinder. The anti-lock brake system basically includes a plurality of solenoid valves, an ECU to control the solenoid valves, an accumulator, and a hydraulic pump.

The solenoid valves are classified into normal open type solenoid valves, which are arranged at the upstream side of a hydraulic brake and are normally kept in an opened state, and normal close type solenoid valves which are arranged at the downstream side of the hydraulic brake and are normally kept in a closed state.

FIG. 1 is a sectional view illustrating a configuration of a conventional normal close type solenoid valve. As shown in FIG. 1, the conventional normal close type solenoid valve (hereinafter, referred to as a "solenoid valve") is installed in a modulator block 1 to enhance responsiveness. The modulator block 1 is formed with a bore 2 by cutting for installation of the solenoid valve.

A first valve block 3 is fitted in a hollow first valve block 3. A cylindrical guide sleeve 4 is coupled to one end of the first valve block 3, and an armature 5 is disposed in the guide sleeve 4. Also, a valve core 6 is fitted into an open end of the guide sleeve 4 and serves to drive the armature 5.

A plunger 5a is integrally provided at one end of the armature 5, and serves to open or close a flow-hole 7a of a valve seat 7 according to sliding movement of the armature 5. A return spring 5b is inserted between the other end of the armature 5 and the valve core 6. The return spring 5b elastically supports the armature 5 such that the armature 5 normally keeps the flow-hole 7a in a closed state.

An O-ring 8 is fitted around the first valve block 3 to seal a gap between an entrance-side and an exit-side of the solenoid valve. An orifice plate 9 is coupled to a lower end of the first valve block 3. The orifice plate 9 has an orifice 9a to regulate a flow rate of fluid to be discharged from the solenoid valve.

In addition, an exciting coil (not shown) is installed around the guide sleeve 4 and the valve core 6, to cause sliding movement of the armature 5.

In operation of the above-described solenoid valve, when power is applied to the exciting coil, a magnetic force is generated between the valve core 6 and the armature 5. As the armature 5 is moved toward the valve core 6 by the magnetic force, the flow-hole 7a of the valve seat 7 is opened. On the other hand, since no magnetic force is exerted when no power is applied to the exciting coil, the armature 5 is returned to an original position thereof by an elastic force of the return spring 5b, closing the flow-hole 7a.

As described above, the conventional solenoid valve is constituted such that constituent elements thereof are arranged about the first valve block 3, and thus, the first valve block 3 must have installation spaces for the valve seat 7, O-ring 8 and orifice plate 9 and inlet and outlet holes 3a and 3b for fluid-flow. Therefore, the first valve block 3 has problems of a large overall size and complicated configuration. The complicated configuration of the first valve block 3 inevitably entails a complex manufacturing process, and results in deterioration of product competitiveness due to an increased production price of the valve.

SUMMARY OF THE INVENTION

Therefore, it is an aspect of the invention to provide a solenoid valve for a brake system, which enables miniaturization of the valve and has an improved configuration to facilitate assembly and production of the valve.

Additional aspects and/or advantages of the invention will be set forth in part in the description which follows and, in part, will be obvious from the description, or may be learned by practice of the invention.

In accordance with an aspect of the invention, the above and/or other aspects can be achieved by the provision of a solenoid valve for a brake system, comprising: an armature provided at one end thereof with an opening/closing member; a valve housing including a hollow first valve block fixed in a modulator block and a second valve block disposed below the first valve block and having an inlet for introduction of fluid; a valve seat installed in the first valve block and having a flow-hole to be opened or closed by the opening/closing member and a hollow extending longitudinally from the flow-hole; and an orifice sleeve located in the second valve block to define a fluid discharge passage and having an orifice formed in one end thereof to communicate with the hollow of the valve seat.

The first valve block may include a longitudinally-extending connection passage defined therein.

A lower end of the first valve block may be press-fitted in one end of the second valve block, and the other end of the second valve block may be supported by the orifice sleeve.

The orifice sleeve may include a bent portion to receive the other end of the second valve block.

One end of the orifice sleeve may be press-fitted in the hollow of the valve seat.

The other end of the orifice sleeve may be press-fitted in the modulator block.

In accordance with another aspect of the invention, the above and/or other aspects can be achieved by the provision of a solenoid valve for a brake system, comprising: an armature provided at one end thereof with an opening/closing member; a valve housing including a hollow first valve block fixed in a modulator block and a second valve block disposed below the first valve block and having an inlet for introduction of fluid; and an orifice sleeve located in the valve housing to define a fluid discharge passage and having an orifice formed in one end thereof so as to be opened or closed by the opening/closing member.

The first valve block may include a longitudinally-extending connection passage defined therein.

A lower end of the first valve block may be press-fitted in one end of the second valve block, and the other end of the second valve block may be supported by the orifice sleeve.

The orifice sleeve may include a bent portion to receive the other end of the second valve block.

One end of the orifice sleeve may be press-fitted in a hollow of the first valve block.

The other end of the orifice sleeve may be press-fitted in the modulator block.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
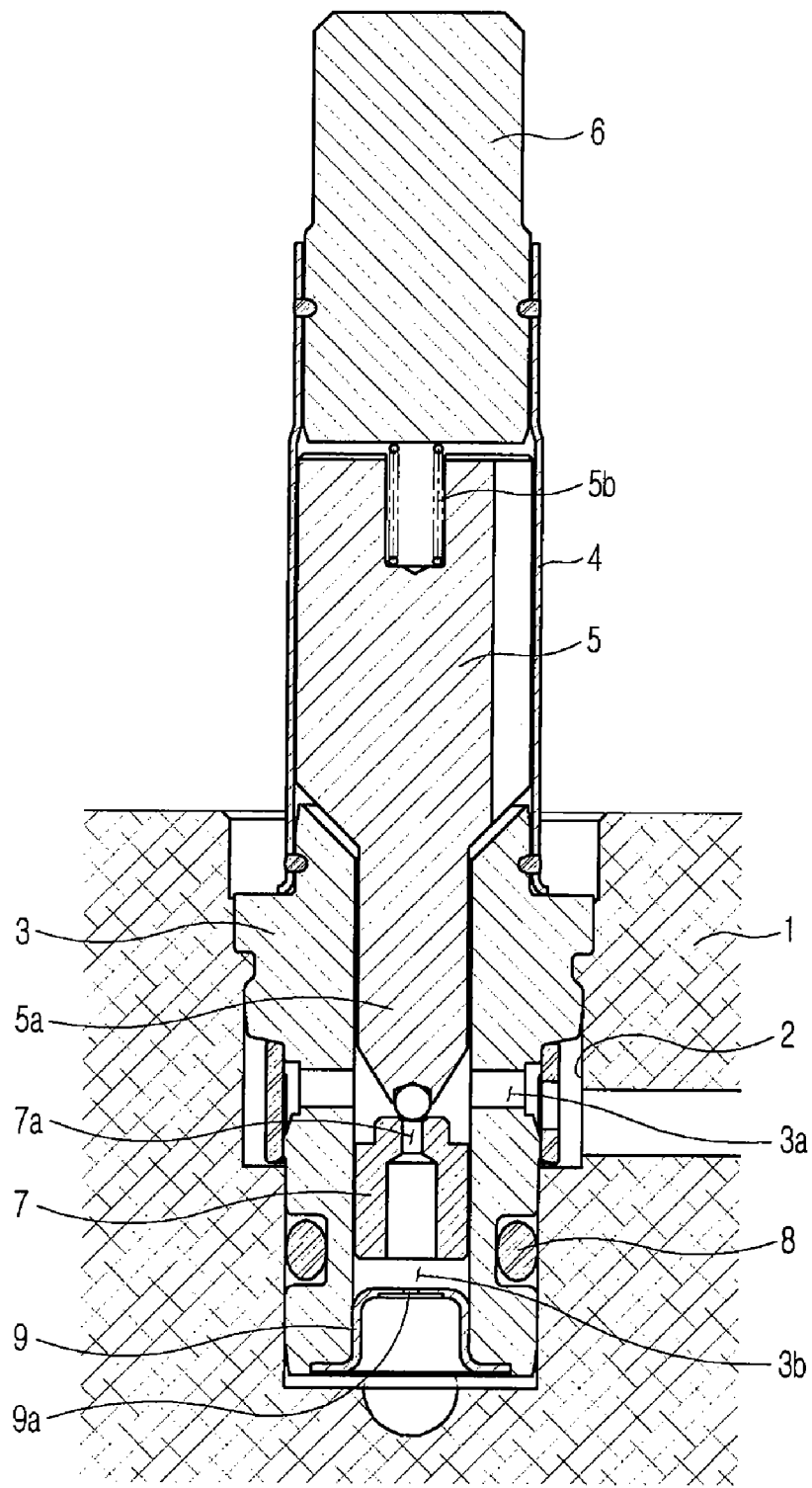
FIG. 1 is a sectional view illustrating a configuration of a conventional normal close type solenoid valve.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
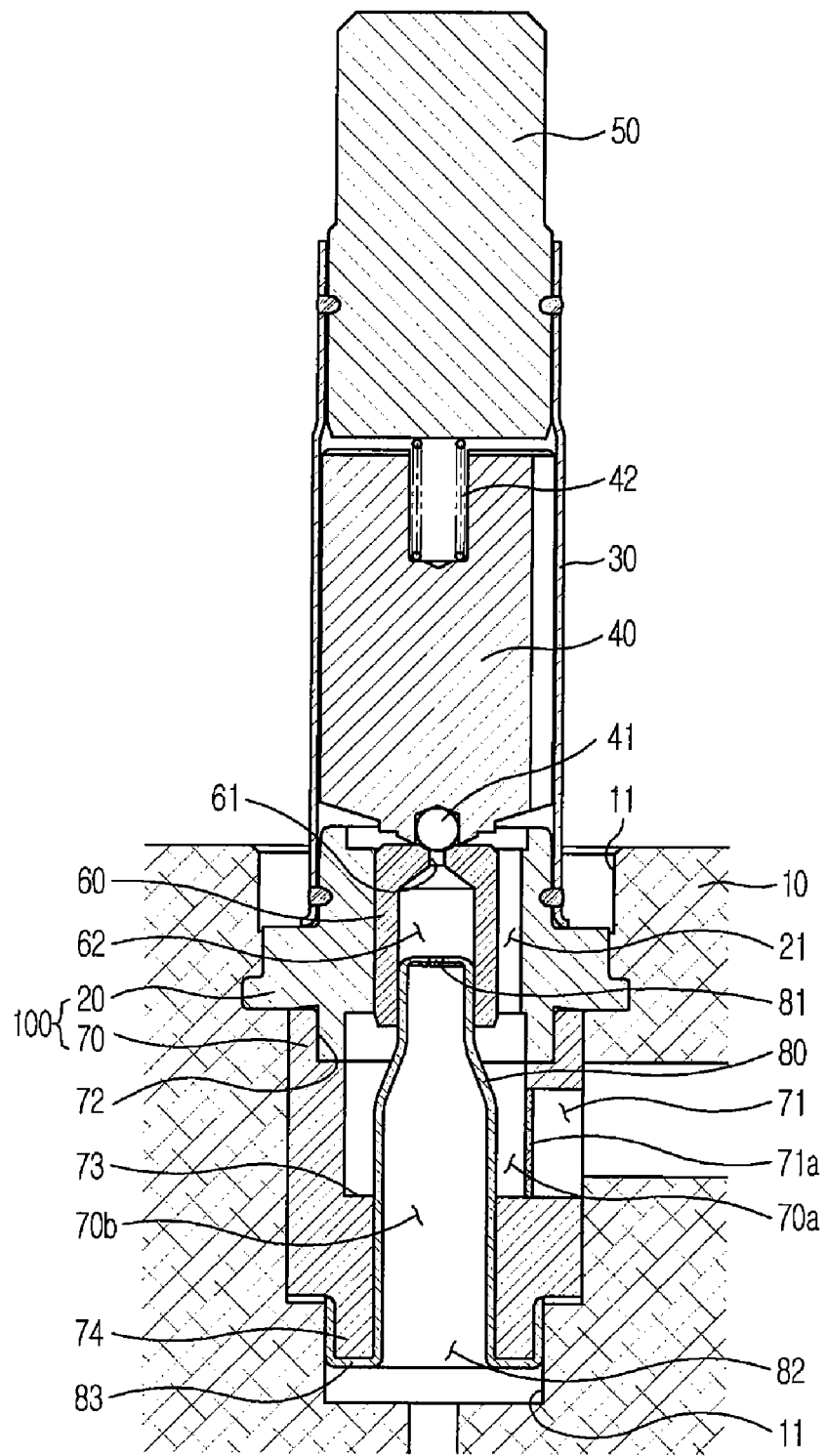
FIG. 2 is a sectional view illustrating a configuration of a solenoid valve for a brake system according to an embodiment of the present invention.

FIG. 2 is a sectional view illustrating a configuration of a solenoid valve for a brake system according to an embodiment of the present invention. As shown in FIG. 2, the solenoid valve for a brake system according to the present invention is installed in a valve block 10. The valve block 10 is formed with a valve bore 11 by cutting for installation of constituent elements of the valve.

A hollow valve housing 100 of the solenoid valve is fitted in the valve bore 11. The valve housing 100 includes a first valve block 20 to which a cylindrical guide sleeve 30 is coupled, and a second valve block 70 disposed below the first valve block 20 and having an inlet 71 for introduction of fluid.

An armature 40 is disposed in the guide sleeve 30, and a valve core 50 to drive the armature 40 is coupled to an open end of the guide sleeve 30.

A ball-shaped opening/closing member 41 is installed at one end of the armature 40. The opening/closing member 41 opens or closes a flow-hole 61 of a valve seat 60 according to sliding movement of the armature 40. Also, a return spring 42 is inserted between the other end of the armature 40 and the valve core 50, and elastically supports the armature 40 such that the armature 40 normally keeps the flow-hole 61 in a closed state.

The valve seat 60 is fitted in the first valve block 20. The valve seat 60 has the flow-hole 61 to be opened or closed by the opening/closing member 41 and a hollow 62 extending downward from the flow-hole 61. The first valve block 20 is internally formed with a connection passage 21, to allow fluid, introduced into the second valve block 70 through an inlet 71 of the second valve block 70, to flow toward the flow-hole 61.

The hollow second valve block 70 is installed below the first valve block 20. An upper end of the second valve block 70 adjacent to the first valve block 20 is formed with a stepped portion 72, and a lower end of the first valve block 20 is press-fitted in the stepped portion 72. This configuration can prevent the fluid introduced into the second valve block 70 from leaking toward the valve bore 11.

The inlet 71 of the second valve block 70 corresponds to an entrance of the solenoid valve. The inlet 71 is provided with a filter 71a to filter impurities contained in the fluid before introduction thereof into the second valve block 70.

An orifice sleeve 80, formed by a deep-drawing process, is installed in the second valve block 70. One end of the orifice sleeve 80 is press-fitted in the hollow 62 of the valve seat 60, and the other end is press-fitted in the valve bore 11. The end of the orifice sleeve 80, press-fitted in the valve seat 60, is formed with an orifice 81 to regulate a flow rate of fluid. The orifice 81 has a cross sectional area determined according to characteristics of a vehicle. The other end of the orifice sleeve 80, press-fitted in the valve bore 11, is opened, forming an outlet 82 that corresponds to an exit of the solenoid valve.

The above-described orifice sleeve 80 divides the interior of the second valve block 70 into an introduction passage 70a and a discharge passage 70b. The introduction passage 70a allows the fluid, introduced into the second valve block 70, to flow toward the flow-hole 61, and the discharge passage 70b allows the fluid, having passed through the flow-hole 61, to flow toward the outlet 82.

The second valve block 70 has a protrusion 73 formed at an inner surface thereof to protrude horizontally toward the orifice sleeve 80. The protrusion 73 comes into close contact with an outer surface of the orifice sleeve 80.

The second valve block 70 further has a small-diameter lower end portion 74, and the orifice sleeve 80 has a bent portion 83 configured to receive the small-diameter lower end portion 74 of the second valve block 70. The bent portion 83 is formed by primarily bending an end of the orifice sleeve 80 to extend horizontally, and then, secondarily bending the horizontally-extended end upward to extend vertically. The small-diameter lower end portion 74 of the second valve block 70 is press-fitted in the bent portion 83 to thereby be supported by the orifice sleeve 80. This configuration can prevent the fluid in the introduction passage 70a from leaking toward the outlet 82 along the outer surface of the sleeve 80.

Figure 3:
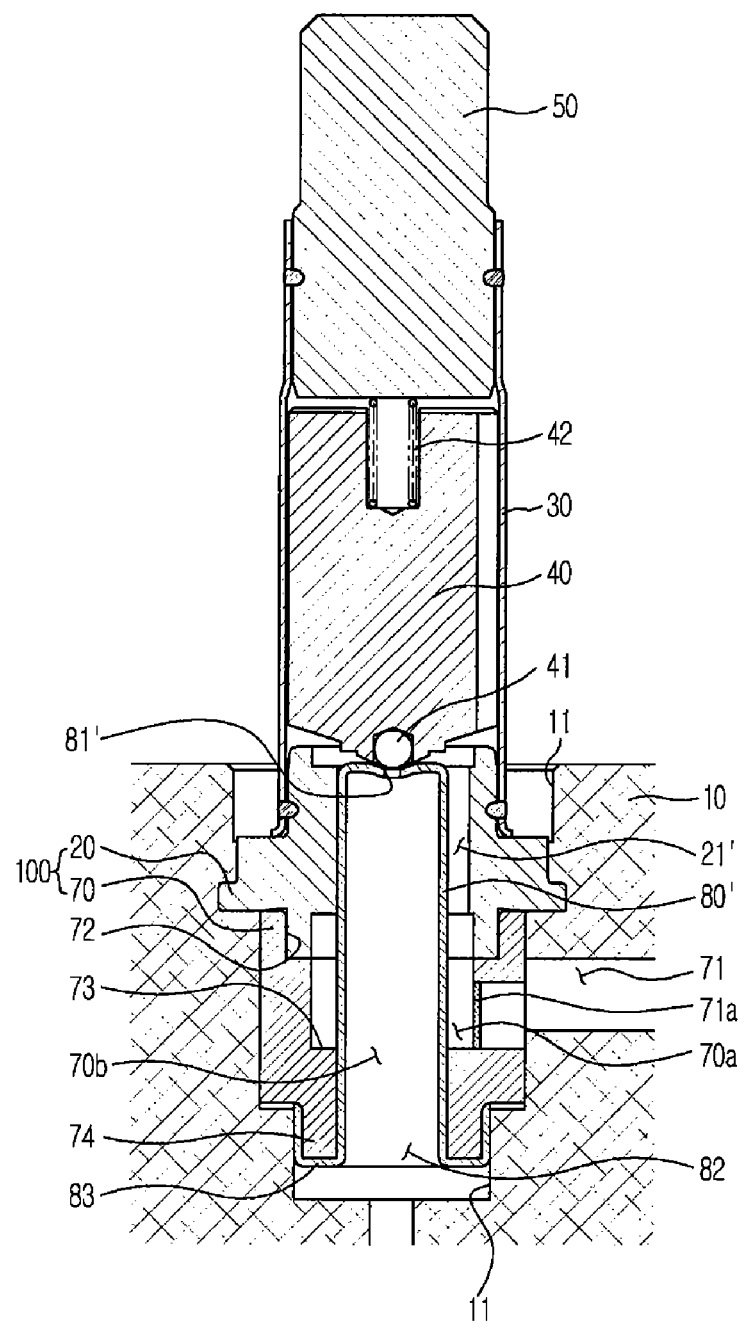
FIG. 3 is a sectional view illustrating a configuration of a solenoid valve for a brake system according to another embodiment of the present invention.

FIG. 3 is a sectional view illustrating a configuration of a solenoid valve for a brake system according to another embodiment of the present invention. In the following description, parts or configurations having extremely similar functions as the above-described embodiment are designated by the same reference numerals, and a detailed description thereof is omitted.

Referring to FIG. 3 illustrating the solenoid valve for a brake system according to another embodiment of the present invention, the valve seat 60 is removed from the interior of the first valve block 20, and an orifice 81' formed at an orifice sleeve 80' can function as the flow-hole 61 of the valve seat 60 shown in FIG. 2. Accordingly, the present embodiment has a feature of further simplifying the interior configuration of the valve housing 100.

Specifically, the orifice sleeve 80' has an elongated tube form having a longer length than a width thereof, and is installed in an interior space of the valve housing 100. One end of the orifice sleeve 80' is press-fitted in the first valve block 20, and the other end is press-fitted in the second valve block 70.

The orifice sleeve 80' divides the interior space of the valve housing 100 into a connection passage 21' communicating with the inlet 71, and a discharge passage 70b communicating with the outlet 82.

The orifice 81' is formed in the end of the orifice sleeve 80' press-fitted in the first valve block 20, to enable communication between the connection passage 21' and the discharge passage 70*b*.

The orifice 81' is opened or closed by the ball-shaped opening/closing member 41 provided at one end of the armature 40. Specifically, the opening/closing member 41 is disposed above the orifice sleeve 80. When the armature 40 pushes the opening/closing member 41 toward the orifice sleeve 80', the opening/closing member 41 comes into close contact with the orifice sleeve 80', closing the orifice 81'. On the other hand, when the armature 40 moves upward and does not apply pressure to the opening/closing member 41, the opening/closing member 41 is spaced apart from the orifice sleeve 80' by interior oil pressure of the valve housing 10, opening the orifice 81'.

With the above-described operation, oil, introduced through the inlet 71 of the valve housing 100, moves to the orifice 81' along the connection passage 21', and then, moves along the discharge passage 70*b* after passing through the orifice 81'.

As described above, the solenoid valve for a brake system according to the present invention can be constructed by assembling the first valve block 20, second valve block 70 and orifice sleeve 80 or 80'. With this configuration, the respective constituent elements of the solenoid valve can be simplified in configuration and be easily assembled, and also, the solenoid valve can prevent leakage of fluid without a sealing member such as an O-ring.

As apparent from the above description, the present invention provides a solenoid valve for a brake system, which adopts a valve housing consisting of first and second valve blocks having simplified configurations and an orifice sleeve, instead of densely installing constituent elements around a single valve block, thereby enabling simplification in the configuration of respective elements, and preventing leakage of fluid in the valve even without a sealing member such as an O-ring. As a result, the present invention has the effect of simplifying the process of manufacturing products therefrom and reducing manufacturing costs.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A solenoid valve for a brake system, comprising:
   an armature provided at one end thereof with an opening/closing member;
   a valve housing including a hollow first valve block fixed in a modulator block and a second valve block disposed below the first valve block and having an inlet for introduction of fluid; and
   an orifice sleeve located in the valve housing to define a fluid discharge passage and having an orifice formed in one end thereof so as to be opened or closed by the opening/closing member,
   wherein the orifice sleeve includes a bent portion to receive the other end of the second valve block, said bent portion having a first bend forming a horizontally-extending portion, and a second bend forming a vertically-extending portion that includes a terminal end of the orifice sleeve.

2. The solenoid valve according to claim 1, wherein the first valve block includes a longitudinally-extending connection passage defined therein.

3. The solenoid valve according to claim 1, wherein a lower end of the first valve block is press-fitted in one end of the second valve block, and the other end of the second valve block is supported by the orifice sleeve.

4. The solenoid valve according to claim 1, wherein one end of the orifice sleeve is press-fitted in a hollow of the first valve block.

5. The solenoid valve according to claim 4, wherein the other end of the orifice sleeve is press-fitted in the modulator block.

6. A solenoid valve for a brake system, comprising:
   an armature provided at one end thereof with an opening/closing member;
   a valve housing including a hollow first valve block fixed in a modulator block and a second valve block disposed below the first valve block and having an inlet for introduction of fluid;
   a valve seat installed in the first valve block and having a flow-hole to be opened or closed by the opening/closing member and a hollow extending longitudinally from the flow-hole; and
   an orifice sleeve located in the second valve block to define a fluid discharge passage and having an orifice formed in one end thereof to communicate with the hollow of the valve seat,
   wherein one end of the orifice sleeve is press-fitted in the hollow of the valve seat, and
   the orifice sleeve includes a bent portion to receive the other end of the second valve block, said bent portion having a first bend forming a horizontally-extending portion, and a second bend forming a vertically-extending portion that includes a terminal end of the orifice sleeve.

7. The solenoid valve according to claim 6, wherein the first valve block includes a longitudinally-extending connection passage defined therein.

8. The solenoid valve according to claim 6, wherein a lower end of the first valve block is press-fitted in one end of the second valve block, and the other end of the second valve block is supported by the orifice sleeve.

9. The solenoid valve according to claim 6, wherein the other end of the orifice sleeve is press-fitted in the modulator block.

* * * * *